US012466208B2

(12) United States Patent
Kragtorp

(10) Patent No.: US 12,466,208 B2
(45) **Date of Patent: *Nov. 11, 2025**

(54) NON-LINEAR POWER CONTROL OF A THERMAL PRINT HEAD IN A PLASTIC CARD PRINTER

(71) Applicant: Entrust Corporation, Shakopee, MN (US)

(72) Inventor: Wade Kragtorp, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,657

(22) Filed: Apr. 16, 2024

(65) Prior Publication Data

US 2024/0253382 A1 Aug. 1, 2024

Related U.S. Application Data

(63) Continuation of application No. 17/808,196, filed on Jun. 22, 2022, now Pat. No. 11,981,154.

(60) Provisional application No. 63/222,616, filed on Jul. 16, 2021.

(51) Int. Cl.

*B41M 5/00* (2006.01)
*B41J 2/525* (2006.01)
*B41M 5/26* (2006.01)

(52) U.S. Cl.

CPC ............ *B41M 5/0052* (2013.01); *B41J 2/525* (2013.01); *B41M 5/267* (2013.01)

(58) Field of Classification Search

CPC ....... B41M 5/0052; B41M 5/267; B41J 2/525
See application file for complete search history.

(56) References Cited

U.S. PATENT DOCUMENTS 4,825,054 A 4/1989 Rust et al.
4,995,501 A 2/1991 Lundstrom et al.
5,266,781 A 11/1993 Warwick et al.
(Continued)

FOREIGN PATENT DOCUMENTS

CN 101242960 A 8/2008
CN 110290930 A 9/2019
(Continued)

OTHER PUBLICATIONS

International Search Report and Written Opinion, International Patent Application No. PCT/IB2022/055800, Sep. 28, 2022 (10 pages).

(Continued)

*Primary Examiner* — Yaovi M Ameh
(74) *Attorney, Agent, or Firm* — MERCHANT & GOULD P.C.

(57) ABSTRACT

Printing multi-color images on non-vinyl plastic identification documents in identification document printing systems. A non-linear pixel density adjustment curve is used to adjust the pixel density data of a multi-color image to be printed which adjusts the power applied to the thermal print head. The use of a non-linear pixel density adjustment curve to adjust the pixel density data improves the quality of the resulting multi-color printed image, reduces mass transfer of the dye donor layer, and reduces breaking of the carrier film of the print ribbon.

20 Claims, 7 Drawing Sheets

(56) References Cited

U.S. PATENT DOCUMENTS

| | | | |
|---|---|---|---|
| 5,837,991 A | 11/1998 | LaManna et al. | |
| 5,943,238 A | 8/1999 | Nioche et al. | |
| 6,131,817 A | 10/2000 | Miller et al. | |
| 6,384,854 B1 | 5/2002 | Ibs et al. | |
| 6,666,538 B2 | 12/2003 | Yamano | |
| 6,695,205 B1 | 2/2004 | Lundstrom et al. | |
| 6,783,067 B2 | 8/2004 | Kreuter et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 8,111,415 B2 | 2/2012 | Maebashi | |
| 9,904,876 B2 | 2/2018 | Alvig et al. | |
| 9,955,044 B2 * | 4/2018 | Ihara | H04N 1/6027 |
| 11,981,154 B2 * | 5/2024 | Kragtorp | B41J 2/525 |
| 2003/0058326 A1 * | 3/2003 | Araki | B41F 19/062 347/217 |
| 2005/0046655 A1 | 3/2005 | Iannazzi | |
| 2005/0161512 A1 * | 7/2005 | Jones | H04N 1/32133 235/487 |
| 2006/0197793 A1 | 9/2006 | Takahashi et al. | |
| 2007/0187870 A1 | 8/2007 | Lundstrom et al. | |
| 2009/0009579 A1 | 1/2009 | Yamazaki | |
| 2009/0309946 A1 | 12/2009 | Saquib | |
| 2013/0220984 A1 | 8/2013 | Cronin et al. | |
| 2017/0008302 A1 | 1/2017 | Ihara | |
| 2018/0099521 A1 * | 4/2018 | Wu | B42D 25/309 |
| 2018/0345705 A1 * | 12/2018 | Lien | B41J 2/475 |
| 2023/0018699 A1 | 1/2023 | Kragtorp | |

FOREIGN PATENT DOCUMENTS

| | | | | |
|---|---|---|---|---|
| EP | 0627319 A | | 12/1994 | |
| EP | 1184184 A | | 3/2002 | |
| EP | 2919452 A | | 9/2015 | |
| JP | 2007022092 | | 2/2007 | |
| JP | 2007022092 A | * | 2/2007 | B41J 2/2128 |
| JP | 2018001727 A | | 1/2018 | |

OTHER PUBLICATIONS

Extended European Search Report dated Apr. 4, 2025, for European Application No. 22841560.0; 9 pages.

Office Action dated Jun. 5, 2025, for Chinese Application No. 202280050309.4; 9 pages.

* cited by examiner

NON-LINEAR POWER CONTROL OF A THERMAL PRINT HEAD IN A PLASTIC CARD PRINTER

RELATED APPLICATIONS

This application is a continuation of application Ser. No. 17/808,196, filed Jun. 22, 2022, which claims benefit of provisional application Ser. No. 63/222,616, filed Jul. 16, 2021, the entire contents of which are hereby incorporated herein by reference.

FIELD

This technical disclosure relates to printing multi-color images on identification documents such as plastic cards including, but not limited to, financial (e.g., credit, debit, or the like) cards, access cards, driver's licenses, national identification cards, business identification cards, gift cards, and other plastic cards.

BACKGROUND

It is known to print a multi-color image, such as a portrait image of a person, on a plastic card or other identification documents using a thermal print head and a multi-color print ribbon that includes a repeating series of dye color panels. Typical dye print ribbons include a carrier film having repeating sequences of panels of different color dye donor layers applied to one side thereof. In a typical printing application, a thermal print head applies heat to the side of the carrier film opposite the dye donor layers while one panel of dye donor layer is in contact with the plastic card or other substrate to be printed. The heat causes the dye to move from the dye donor layer of the panel into the substrate by a mechanism commonly known as dye diffusion printing.

When printing dark pixels of a multi-color image, total (i.e. complete) transfer of the dye donor layer can occur (often called mass transfer). The total transfer of the dye donor layer is undesirable as the printed image is much darker in the areas where total transfer occurs and the mass transfer often results in breaking of the carrier film.

Total transfer of the dye donor layer is more problematic with certain types of substrate materials than others. For example, polyethylene terephthalate glycol (PETG) or polycarbonate substrates do not accept dyes as readily as other plastic substrates. As such, for PETG or polycarbonate substrates, more print head power is needed to get images with attractive color density. However, the higher print head power increases the likelihood that total transfer of the dye donor layer will occur.

FIG. 1 illustrates a standard linear curve 10 used to print a multi-color image, along with a standard linear adjustment curve 12 that is used to adjust the pixel data and thereby adjust the power to the thermal print head in an effort to reduce mass transfer and breakage of the carrier film. However, with the linear adjustment curve 12, at the higher pixel density values, mass transfer and breakage of the carrier film is still problematic. In addition, at lower pixel density values, which are often used to print skin-tones in a portrait image of a person, the resulting image quality is often poor.

SUMMARY

Printing multi-color images on non-vinyl plastic identification documents in identification document printing systems are described. A non-linear pixel density adjustment curve is used to adjust the pixel density data of a multi-color image to be printed which adjusts the power applied to the thermal print head. The use of a non-linear pixel density adjustment curve to adjust the pixel density data improves the quality of the resulting multi-color printed image, reduces mass transfer of the dye donor layer, and reduces breaking of the carrier film of the print ribbon.

The non-vinyl plastic identification documents can be PETG or polycarbonate plastic identification documents. However, the plastic identification documents can be formed from any type of plastic that would benefit from using a non-linear pixel density adjustment curve as described herein. The identification documents may be plastic cards of the type that are issued to a card holder. Examples of plastic cards include, but are not limited to, driver's licenses, national identification cards, business identification cards, financial (e.g., credit, debit, or the like) cards, access cards, gift cards, and other plastic cards on which a multi-color image is printed. The identification documents may also be passports or a page of a passport on which a multi-color image is to be printed.

In one embodiment described herein, a method of printing a multi-color image on a non-vinyl plastic identification document in a print station of an identification document printing system can include inputting print data corresponding to the multi-color image to be printed into a printer controller that controls operation of the print station. The print data includes pixel density data, and the print data is processed to adjust the pixel density data using a non-linear pixel density adjustment curve to create modified pixel density data. The modified pixel density data is then used to control a thermal print head of the print station to print the multi-color image.

In another embodiment, a method of printing a multi-color portrait image of a person on a polyethylene terephthalate glycol plastic card in a print station of plastic card printing system can include inputting print data corresponding to the multi-color portrait image to be printed into a printer controller that controls operation of the print station. The print data includes pixel density data, and the print data is processed to adjust the pixel density data using a non-linear pixel density adjustment curve to create modified pixel density data. The modified pixel density data is then used to control a thermal print head of the print station to print the multi-color portrait image onto the polyethylene terephthalate glycol plastic card.

In still another embodiment, a plastic card printing system can include a card input configured to input a plastic card, a print station having either a multi-color print ribbon and a thermal print head or a plurality of monochrome print ribbons and multiple thermal print heads, a card transport mechanism for transporting the plastic card from the card input to the print station, and a printer controller connected to and controlling operation of the thermal print head. The printer controller is programmed to include a non-linear pixel density adjustment curve to adjust pixel density data of a multi-color image to be printed.

DETAILED DESCRIPTION

Figure 6:
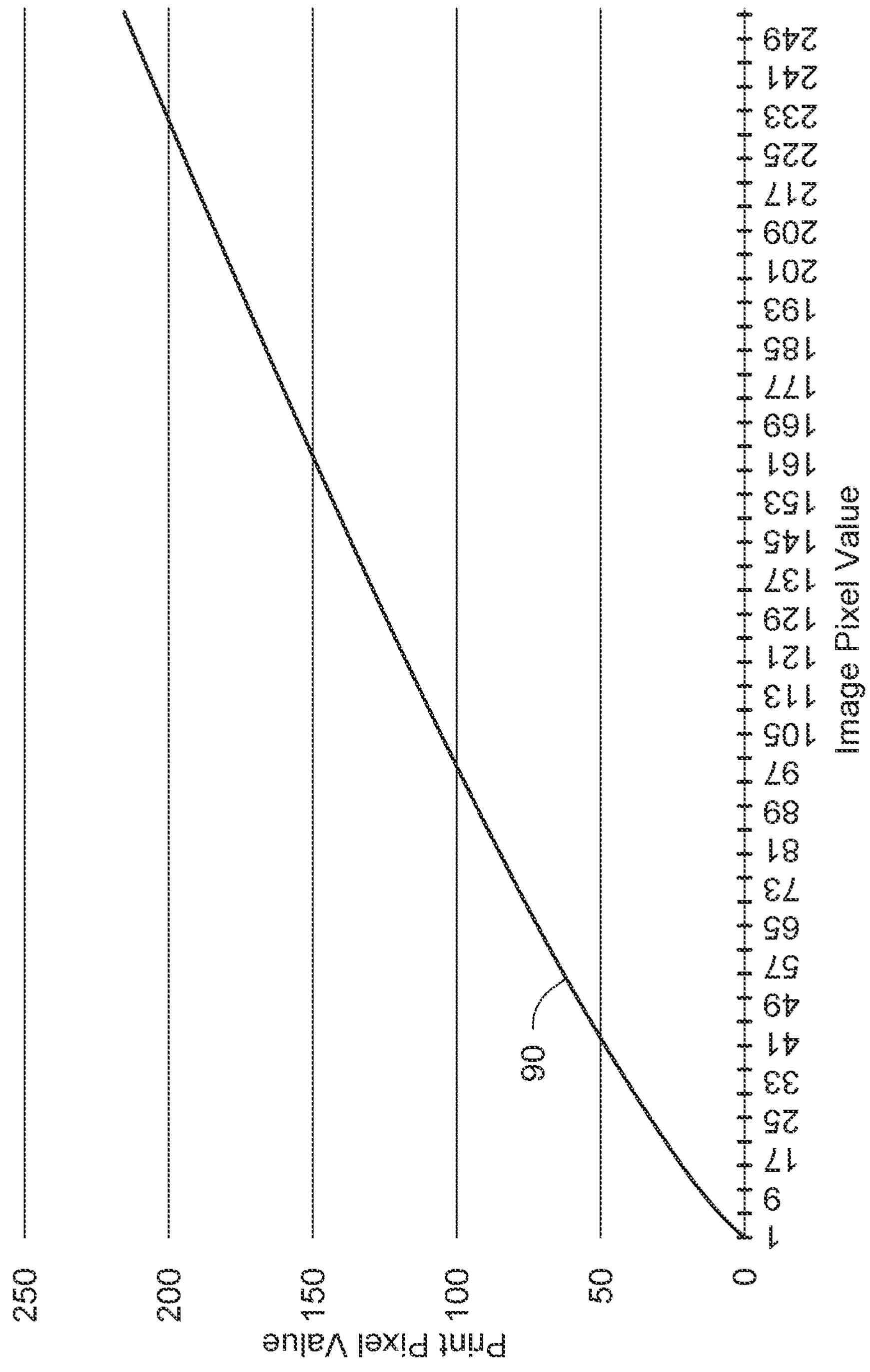
FIG. 6 illustrates a non-linear, gamma pixel density adjustment curve.
Figure 7:
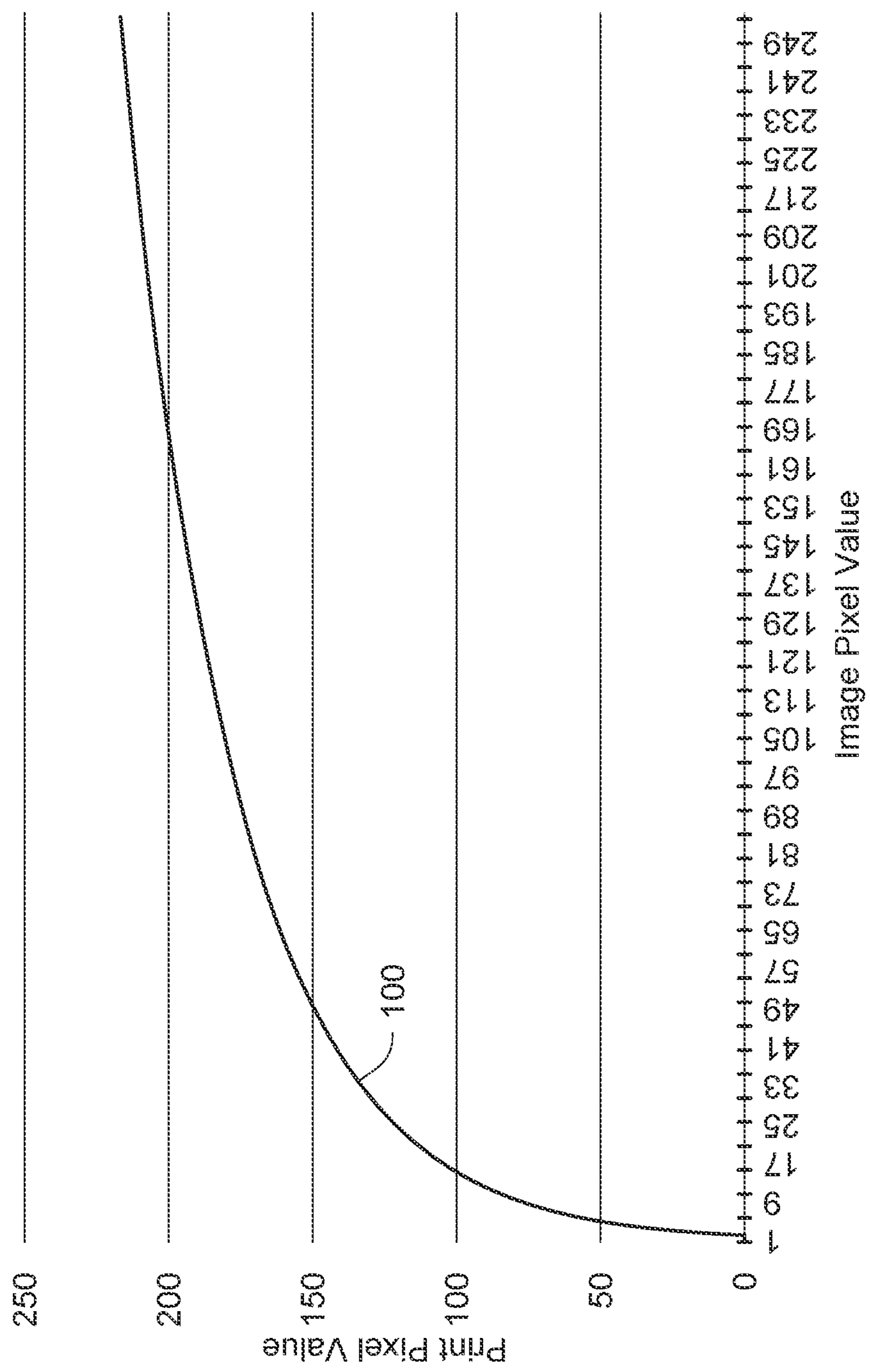
FIG. 7 illustrates a non-linear, logarithmic pixel density adjustment curve.

The following describes a number of example of printing multi-color images on non-vinyl plastic identification documents in identification document printing systems. A non-linear pixel density adjustment curve is used to adjust the pixel density data of a multi-color image to be printed which adjusts the power applied to the thermal print head. The following description describes a quadratic adjustment curve (FIG. 5), a gamma adjustment curve (FIG. 6) and a logarithmic adjustment curve (FIG. 7). However, other forms of adjustment curves can be used. In one embodiment, the non-linear adjustment curve is a downward facing (for example, concave down) adjustment curve.

The non-vinyl plastic identification documents can be PETG or polycarbonate plastic identification documents. However, the plastic identification documents can be formed from any type of plastic that would benefit from using a non-linear pixel density adjustment curve as described herein. The identification documents may be plastic cards of the type that are issued to a card holder. Examples of plastic cards include, but are not limited to, driver's licenses, national identification cards, business identification cards, financial (e.g., credit, debit, or the like) cards, access cards, gift cards, and other plastic cards on which a multi-color image is printed. The identification documents may also be passports or a page of a passport on which a multi-color image is to be printed. The term "plastic cards" as used throughout the specification and claims, unless indicated otherwise, refers to cards where the card substrate can be formed entirely of plastic, formed of a combination of plastic and non-plastic material. In one embodiment, the cards can be sized to comply with ISO/IEC 7810 with dimensions of about 85.60 by about 53.98 millimeters (about 3⅜ inxabout 2⅛ in) and rounded corners with a radius of about 3.18 mm (about ⅛ in). For sake of convenience, the following description will describe the identification document as being a PETG plastic card.

Figure 1:
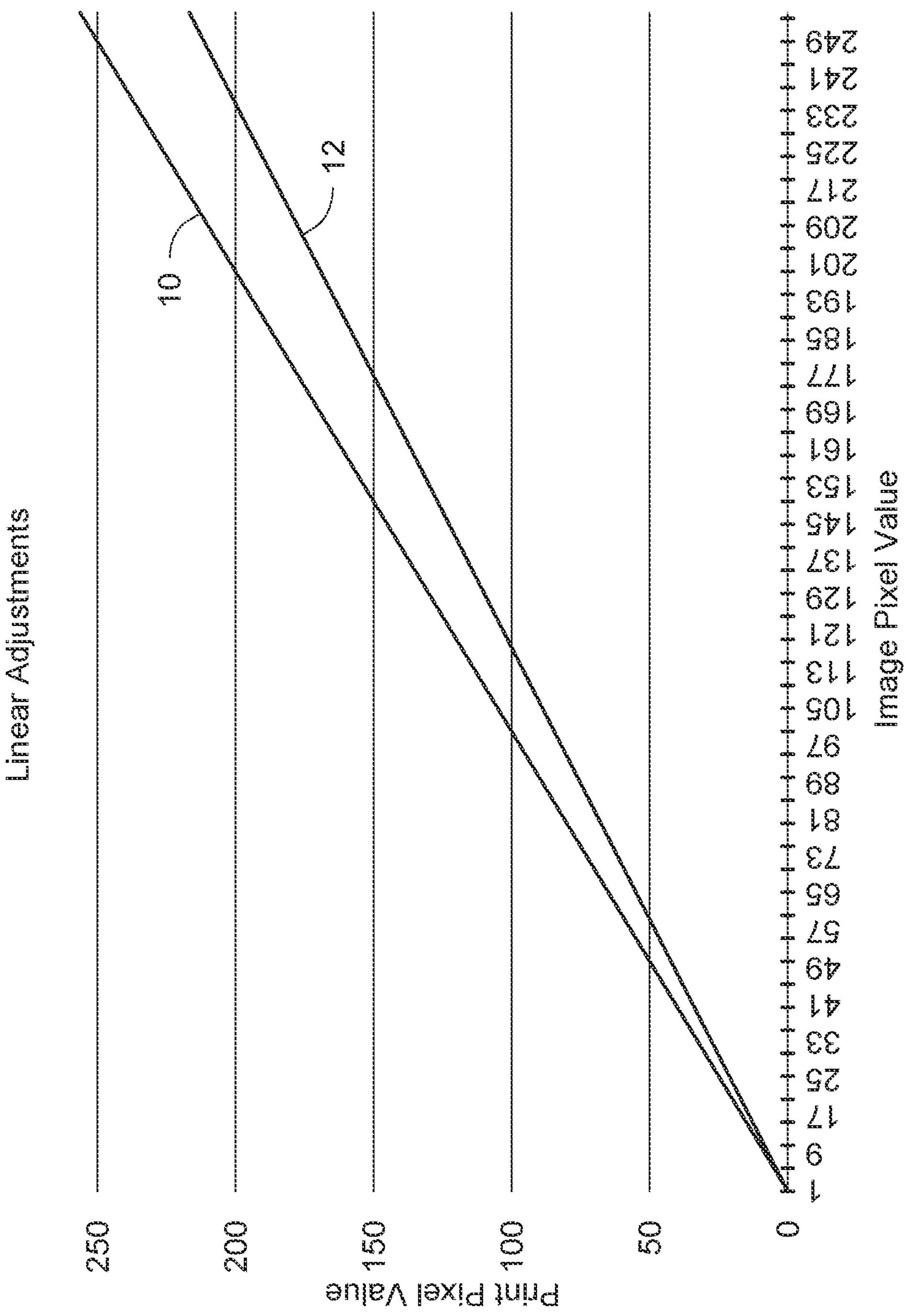
Fig. 1 Prior Art
FIG. 1 illustrates a conventional linear density curve and a conventional linear density adjustment curve.
Figure 2:
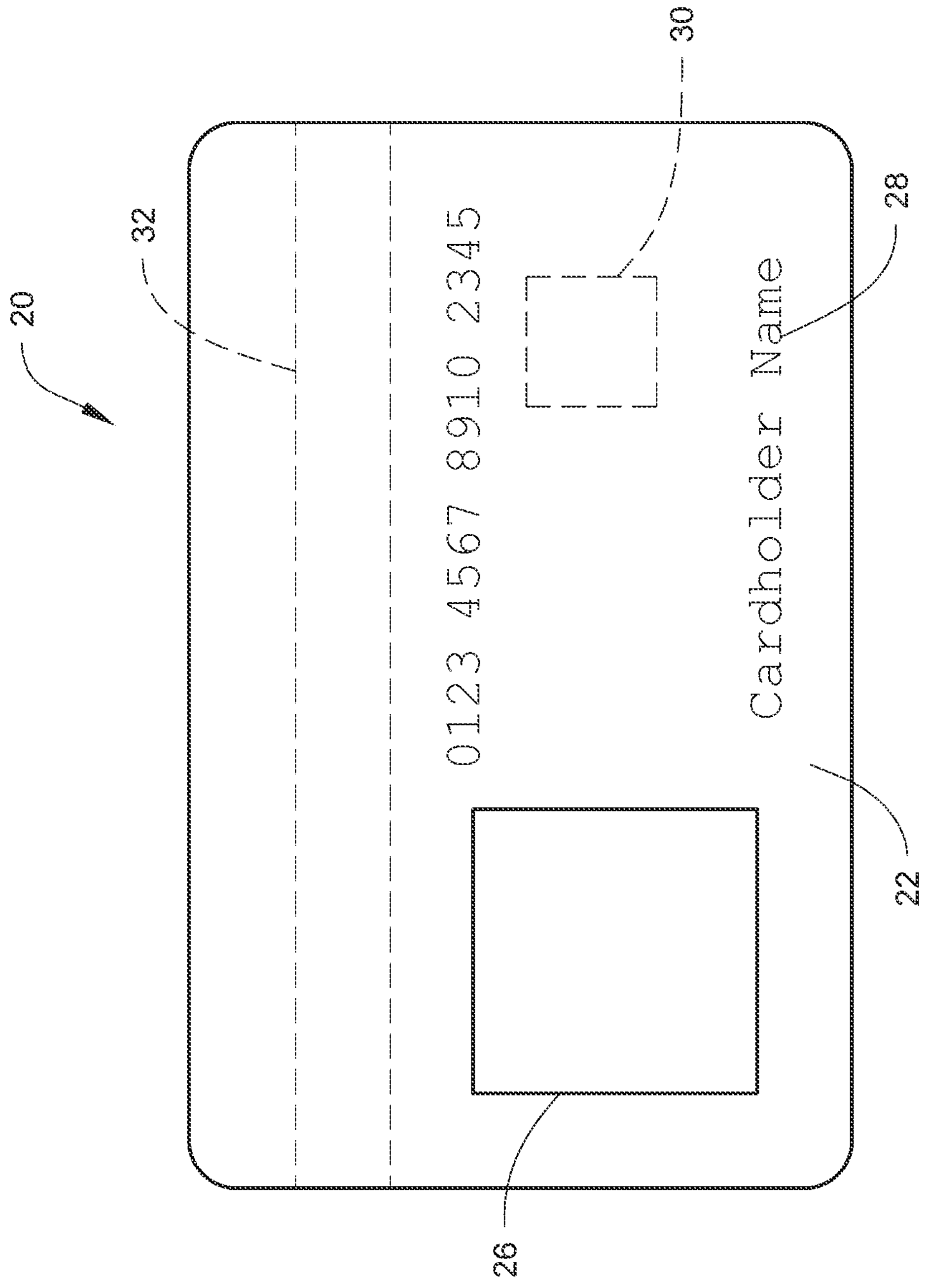
FIG. 2 illustrates an example of a plastic identification document in the form of a plastic card.

Referring to FIG. 2, an example of a PETG plastic card 20 is depicted. The plastic card 20 may include personal data that is personal to the intended card holder, including a personal account number, the card holder's name, a photograph of the intended card holder, an address, an expiration date, and other personal data known in the art. The plastic card 20 may also include non-personal data such as a name and/or logo of the card issuer and graphical elements. The card 20 is shown to include a front surface 22 and a rear or back surface 24 (best seen in FIG. 4) opposite the front surface 22. The card 10 can also include a multi-color portrait image 26 of the intended card holder, other personal data 28 such as the name of the intended cardholder, an optional programmable integrated circuit chip 30, and an optional magnetic stripe 32. The portrait image 26 or other multi-color image on the card surfaces 22, 24 (for example a background graphical image) may be printed using the techniques described below.

Figure 3:
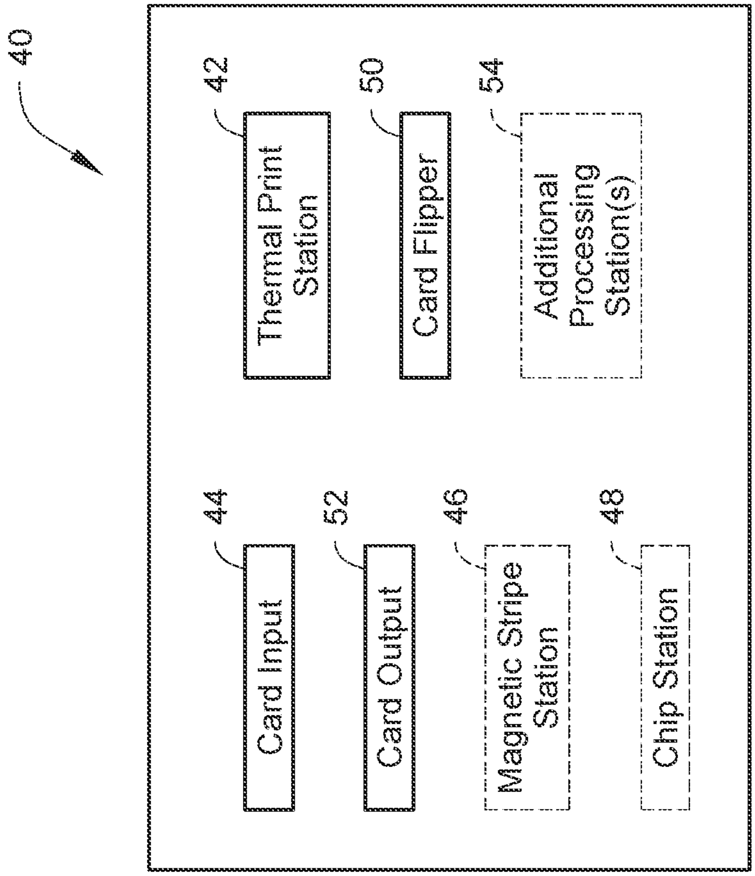
FIG. 3 is a schematic illustration of an embodiment of an identification document printing system described herein.

Referring to FIG. 3, an example of an identification document printing system 40 is illustrated. The system 40 may also be referred to as a plastic card printing system when used to print plastic cards. For sake of convenience, the system 40 will be referred to as a plastic card printing system used to print on plastic cards.

The system 40 is shown as including at least a print station 42. The system 40 can further include a card input 44, an optional magnetic stripe station 46, an optional integrated circuit chip station 48 for testing and programming the integrated circuit chip, a card flipper 50 (or card reorienting mechanism), a card output 52, and optionally one or more additional card processing stations 54.

Figure 4:
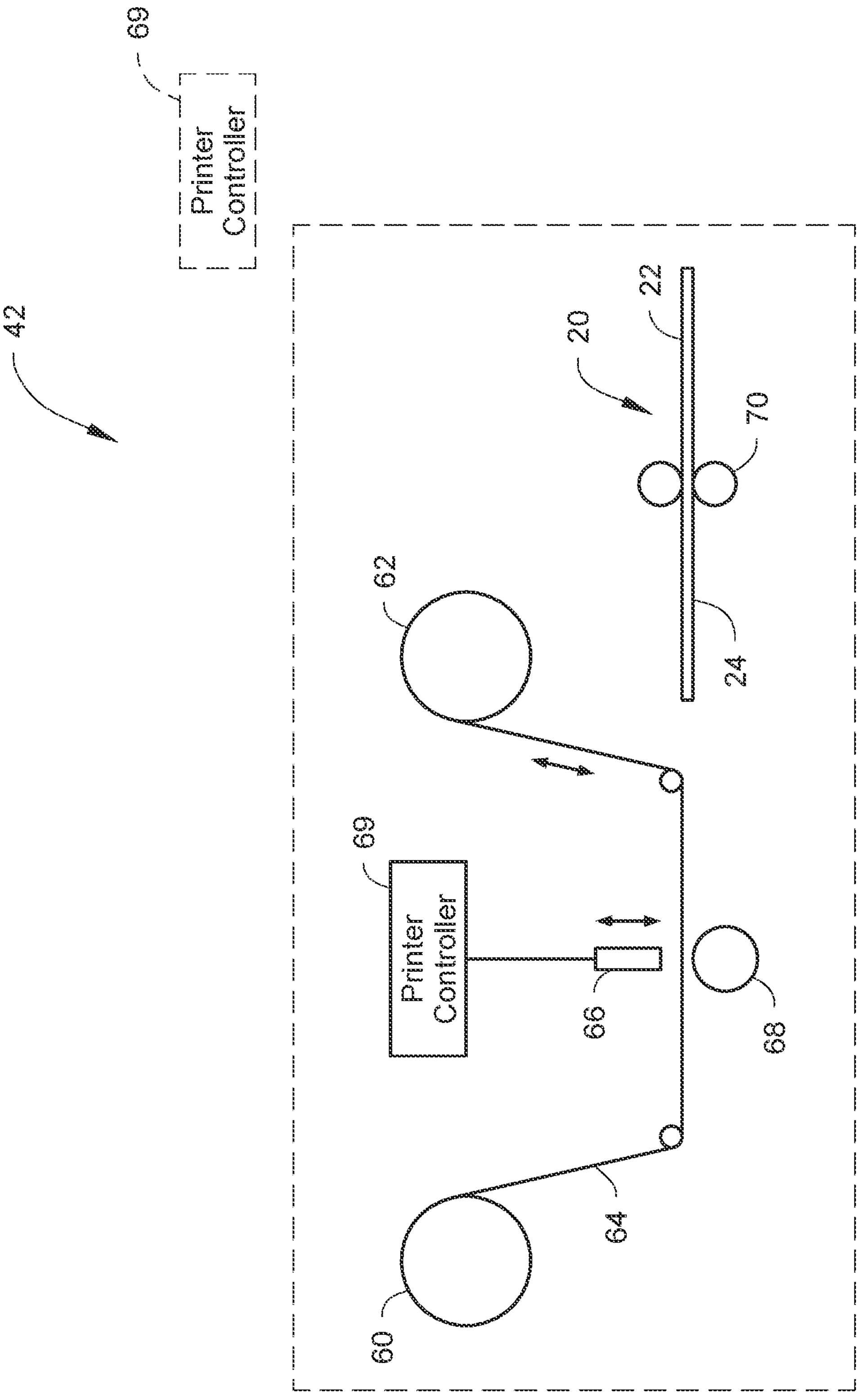
FIG. 4 illustrates an example of a print station of the identification document printing system.

The print station 42 is configured to personalize the plastic card 20 by printing on one or more surfaces of the plastic card 20, for example printing the portrait image 26 on the surface 22. Referring to FIG. 4, the print station 42 is configured to perform direct-to-card thermal printing on the plastic card 20. However, the techniques described herein can be utilized with other types of thermal printing including, but not limited to, retransfer printing, such as dye retransfer printing. The print station 42 includes a print ribbon supply 60, a print ribbon take-up 62, a multicolor print ribbon 64, a thermal print head 66, a platen 68 located opposite the print head 66, and a printer controller 69.

The print ribbon 64 can be a multicolor print ribbon known in the art. The print ribbon 64 is supplied from the print ribbon supply 60 and is taken up on the print ribbon take-up 62 after use. The print ribbon 64 includes a plurality of color panels disposed in a repeating sequence. For example, the print ribbon 64 can be a YMCK ribbon with multiple sequences of yellow (Y), magenta (M), cyan (C) and black (K) panels as is well known in the art. The YMC panels are typically dye material, while the K panel is a pigment material. In some embodiments the print ribbon 64 can include one or more additional panels associated with each sequence of color panels, including, but not limited to, panels of topcoat material (often designated as a YMCKT ribbon) and/or overlay material (often designated as a YMCKO ribbon).

The thermal print head 66 can be any thermal print head known in the art of plastic card printing. As would be well understood by a person of ordinary skill in the art, the thermal print head 66 includes a plurality of individually energizable heating elements (not shown) each of which is selectively energizable by an electronic strobe pulse which heats the corresponding heating element to transfer color material from one of the panels of the print ribbon 64 to the plastic card 20. As depicted in FIG. 4, the thermal print head 66 can be moved toward the platen 68 to bring the print head 66 into position during printing in a print pass, and moved away from the platen 68 when not printing to reposition the card 20 for a next print pass.

In another embodiment, the print station 42 can include a plurality of separate monochrome print ribbons (not shown), for example a Y print ribbon, an M print ribbon, a C print ribbon, a K print ribbon, etc. In addition, the print station 42 can include a corresponding plurality of thermal multiple print heads, one thermal print head associated with each monochrome print ribbon. The card 20 is transported through each monochrome print ribbon/thermal print head combination which print each respective color on the card 20 to generate the resulting multi-color image.

One or more mechanical card transport mechanisms, such as one or more pairs of transport rollers 70, transport the card 20 in the printing station 42 as well as throughout system 40. The card transport mechanism is preferably reversible to permit forward and reverse transport of the card 20 to permit implementation of multiple print passes past the print head 66. Mechanical card transport mechanism(s) for transporting plastic cards in plastic card printing systems are well known in the art. Additional examples of card transport mechanisms that could be used are known in the art and include, but are not limited to, transport belts (with tabs and/or without tabs), vacuum transport mechanisms, transport carriages, and the like and combinations thereof. Card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

With continued reference to FIG. 4, the printer controller 69 communicates directly or indirectly with the thermal print head 66. The printer controller 69 can be part of the print station 42 and can be located within a housing (indicated in dashed lines) of the print station 42, or the printer controller 69 can be remote from (i.e. physically separate from) the print station 42 and located outside the housing as indicated in broken lines in FIG. 4. The printer controller 69 processes print data and generates data in the form of strobe pulses to control the energization of the individually energizable heating elements of the thermal print head 66 to generate the printing on the card 20. The printer controller 69 may also control driving of the ribbon supply 60 and/or the print ribbon take-up 62 during printing, control the movements of the thermal print head 66 during printing, and/or control operation of the transport rollers 70 during printing. Alternatively, the driving of the ribbon supply 60 and/or the print ribbon take-up 62, the movements of the thermal print head 66, and/or the operation of the transport rollers 70 may be controlled by a separate control mechanism of the print station 42 either within the print station 42 or remote from the print station 42. For example, in some embodiments, when the printer controller is remote from the print station 42, only the portion of the printer controller that processes print data and generates the strobe pulses to control the energization of the individually energizable heating elements of the thermal print head 66 may be remote or outside of the print station. Other functions of the printer controller 69, such as control of the card transport mechanism(s), control of movement of the print ribbon 64 and the movement of the thermal print head 66, and the like, may be on or in the print station.

The printer controller 69 further includes the non-linear pixel density adjustment curve described further below that is used to adjust the pixel density data of the print data to create modified pixel density data. The multi-color image, such as the portrait image 26 (FIG. 2), is printed using the modified pixel density data.

Returning to FIG. 3, the card input 44 can be a card input hopper designed to hold a plurality of plastic cards waiting to be fed one-by-one into the system 40 for processing. An example of a card input hopper is described in U.S. Pat. No. 6,902,107 which is incorporated herein by reference in its entirety. Alternatively, the card input 44 can be an input slot through which individual cards are fed one-by-one into the system 40. The card input 44 can be positioned at any location in the system 40 relative to the other elements of the system 40 that is suitable for inputting the plastic card.

The magnetic stripe station 46 is optional. If present, the magnetic stripe station 46 can verify the operation of the magnetic stripe on the plastic card and/or encode data on the magnetic stripe. An example of a magnetic stripe station is described in U.S. Pat. No. 6,902,107 which is incorporated herein by reference in its entirety.

The integrated circuit chip station 48 is also optional, and if present, is designed to verify the operation of the chip on the plastic card and/or program the chip with data. The chip station 48 can include a single chip programming station for programming a single card at a time within the station 48, or the station 48 can be configured to simultaneously program multiple cards. A chip station having simultaneous, multiple card programming is described in U.S. Pat. No. 6,695,205 (linear cassette configuration) and in U.S. Pat. No. 5,943,238 (barrel configuration) each of which is incorporated herein by reference in its entirety.

The card flipper 50 is also optional and if present is configured to flip the card 180 degrees so that a surface thereof previously facing in one direction, for example upward, now faces in the opposite direction after being flipped. Card flippers are well known in the art. Examples of suitable card flippers are described in U.S. 2013/0220984 and U.S. Pat. No. 7,398,972 each of which is incorporated herein by reference in its entirety.

The card output 52 can be a card output hopper designed to hold a plurality of processed plastic cards that are output one-by-one after being processed within the system 40. An example of a card output hopper is described in U.S. Pat. No. 6,902,107 which is incorporated herein by reference in its entirety. Alternatively, the card output 52 can be an output slot through which individual cards are output one-by-one. The card output 52 can be located anywhere in the system 40 that is suitable for the output 52.

The additional processing station(s) 54 can be other card processing mechanisms configured to perform other card processing operations. Examples of the additional processing station(s) 54 include one or more of a laminator, an indent mechanism, an embossing mechanism, a laser marking mechanism, a print mechanism other than the one in the print station 42, a vision/quality assurance mechanism, and others.

In one embodiment, the system 40 can be configured as a type of plastic card printing system that is referred to as a desktop card printer or desktop card printing system that is typically designed for relatively small scale, individual plastic card printing. In desktop card printers, a single plastic card to be printed is input into the system, printed, and then output. These systems are often termed desktop machines or desktop printers because they have a relatively small footprint intended to permit the machine to reside on a desktop. Many examples of desktop machines are known, such as the SD or CD family of desktop card machines available from Entrust Corporation of Shakopee, Minnesota. Other examples of desktop card machines are disclosed in U.S. Pat. Nos. 7,434,728, 7,398,972, 9,904,876 each of which is incorporated herein by reference in its entirety.

In another embodiment, the system 40 can be configured as a type of plastic card printing system that is referred to as a central issuance card processing system that is typically designed for large volume batch processing of plastic cards, often employing multiple processing stations or modules to process multiple plastic cards at the same time to reduce the overall per card processing time. Examples of central issuance card processing systems include the MX and MPR family of central issuance systems available from Entrust Corporation of Shakopee, Minnesota. Other examples of central issuance systems are disclosed in U.S. Pat. Nos. 4,825,054, 5,266,781, 6,783,067, and 6,902,107, all of which are incorporated herein by reference in their entirety.

An example of printing a multi-color image, such as the portrait image 26 of FIG. 2, on the plastic card 20 will now be described with reference to FIG. 4. Assuming the image to be printed is the portrait image 26, print data that corresponds to the portrait image is input into or provided in any suitable manner to the printer controller 69. The print data includes pixel density data that indicates the color density of each pixel of the to-be printed portrait image. The printer controller 69 processes the print data to adjust to pixel density data using a non-linear pixel density adjustment curve (or just non-linear density curve) thereby creating modified pixel density data. The modified pixel density data is then used to control the power supplied to the individually energizable heating elements of the thermal print head to print the portrait image.

Figure 5:
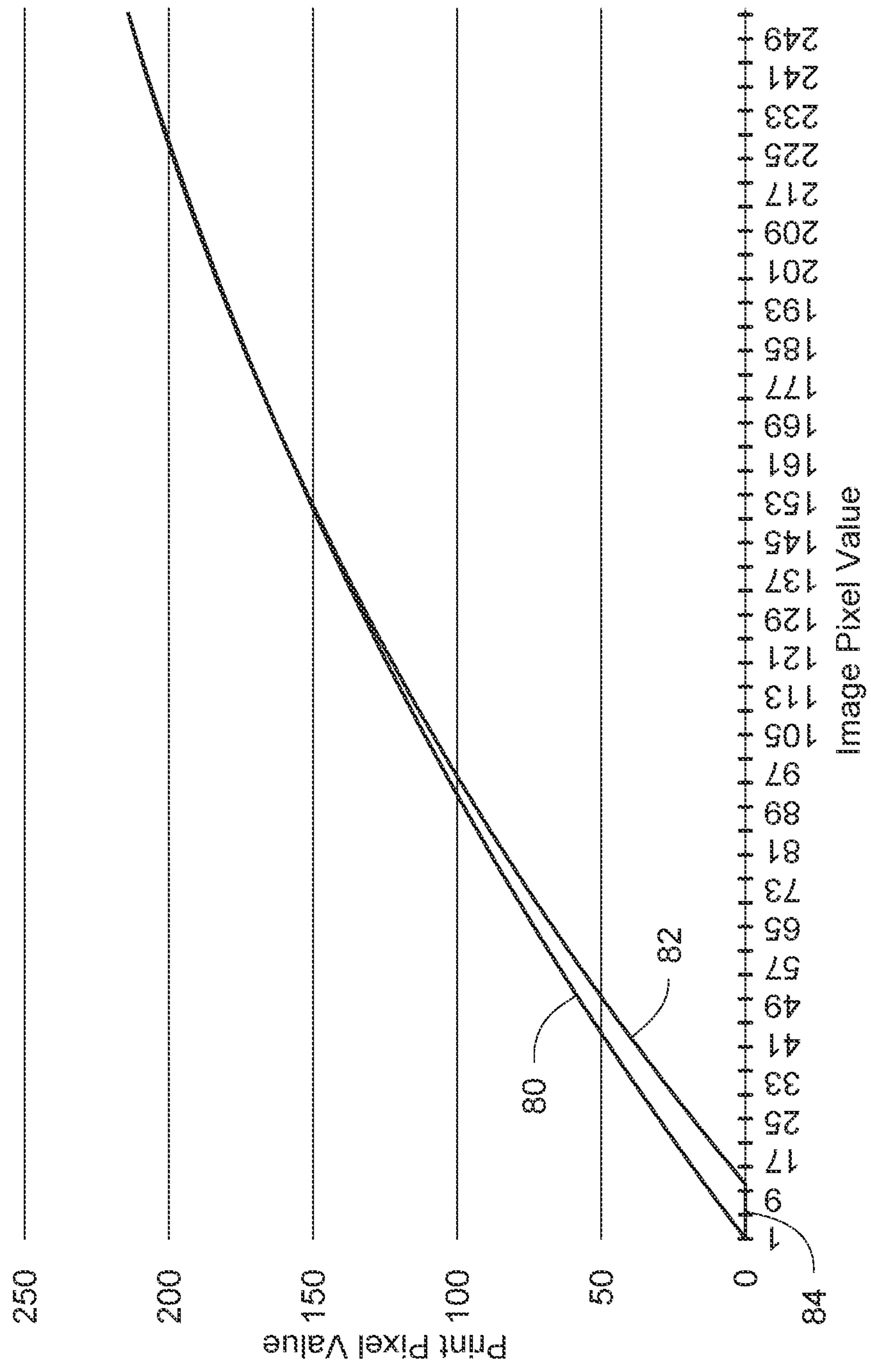
FIG. 5 illustrates a pair of non-linear, quadratic pixel density adjustment curves.

The non-linear pixel density adjustment curve may be stored in the printer controller 69 or stored elsewhere that is accessible by the printer controller 69. FIGS. 5-7 illustrate examples of possible non-linear pixel density adjustment curves. However, other non-linear pixel density adjustment curves may be used. In one embodiment, the non-linear adjustment curve can be a parametric curve. One form of a parametric curve is a quadratic curve. However, other forms of parametric curves can be used.

FIG. 5 illustrates an example of a quadratic density curve 80. The curve 80 is derived from the quadratic equation:

$$ax^2+bx+c=0$$

Three points defining the density curve 80 include:

$x_1,y_1$—This point defines the lightest pixel density (which is a white color).

$x_2,y_2$—This point is set to separate the darkest densities from light and medium pixel densities.

$x_3,y_3$—This point sets the darkest pixel density (which is a black color).

Using the three points to determine a, b, & c:

$$m=x_1-x_2$$

$$n=x_3-x_2$$

$$a=(n(y_1-y_2)+m(y_3-y_2))/(n(x_1^2-x_2^2)+m(x_3^2-x_2^2))$$

$$b=((y_3-y_2)-a(x_3^2-x_2^2))/(x_3-x_2)$$

$$c=y_1-ax_1^2-bx_1$$

For each x in the density curve 80 (the image pixel value, x-axis), the a, b, & c values and the quadratic equation are used to determine y (the printed pixel value, y-axis):

$$y=ax^2+bx+c.$$

With continued reference to FIG. 5, another example of a quadratic density curve 82 is illustrated which is a modification of the quadratic density curve 80. In the density curve 82, the portion of the curve 82 at the lightest pixel densities is modified whereby the print pixel values (y-axis) are set to zero or around zero for input or image pixel values (x-axis) up to around pixel value 10, and then the quadratic non-linear portion of the curve 82 begins. Setting the print pixel values to zero in this manner helps to improve the print quality of light pixel density portions of the portrait image, such as the quality of the skin tone of the person in the portrait image.

FIG. 6 illustrates a non-linear, gamma pixel density adjustment curve 90 that is derived using a known gamma correction. The gamma correction can be implemented using a number of formulas. For example, in one embodiment, the gamma correction can be implemented using the following formula:

$$y=x_{max}*x^{gamma}$$

Further information on gamma correction of images can be found at https://en.wikipedia.org/wiki/Gamma_correction.

FIG. 7 illustrates a non-linear, logarithmic pixel density adjustment curve 100 that is derived using the known logarithmic function $y=\log_a x$.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of printing a multi-color image on a non-vinyl plastic identification card, having an integrated circuit chip, in a print station of an identification card printing system, comprising:

generating modified pixel density data by adjusting pixel density data that is associated with print data corresponding to the multi-color image using a non-linear pixel density adjustment curve; and printing the multi-color image on the non-vinyl plastic identification card using a multicolor print ribbon and a thermal print head of the print station by controlling the thermal print head using the modified pixel density data.

2. The method of claim 1, comprising printing the multi-color image directly onto the non-vinyl plastic identification card using the multicolor print ribbon and the thermal print head.

3. The method of claim 1, wherein the non-linear pixel density adjustment curve comprises a parametric curve.

4. The method of claim 3, wherein the parametric curve comprises a quadratic curve.

5. The method of claim 1, wherein the non-vinyl plastic identification card has dimensions of about 85.60 mm by about 53.98 mm with rounded corners with a radius of about 3.18 mm.

6. The method of claim 1, wherein the multi-color image comprises a background graphical image.

7. The method of claim 1, further comprising:

prior to or after printing the multi-color image, at least one of the following:

encoding data on a magnetic stripe on the non-vinyl plastic identification card;

programming data on the integrated circuit chip on the non-vinyl plastic identification card;

printing data on the non-vinyl plastic identification card;

using a laser to mark data on the non-vinyl plastic identification card.

8. The method of claim 1, wherein the identification card printing system comprises a desktop card printing system.

9. The method of claim 1, wherein the identification card printing system comprises a central issuance card processing system.

10. The method of claim 1, further comprising programming the integrated circuit chip.

11. The method of claim 1, wherein the non-vinyl plastic identification card comprises a financial card.

12. A non-vinyl plastic identification card printing system, comprising:

a card input configured to input a non-vinyl plastic identification card having an integrated circuit chip;

a print station having a multicolor print ribbon and a thermal print head;

a card transport mechanism configured to transport the non-vinyl plastic identification card from the card input to the print station;

a printer controller connected to and controlling operation of the thermal print head, the printer controller is programmed to include a non-linear pixel density adjustment curve to adjust pixel density data of a multi-color image to be printed onto the non-vinyl plastic identification card.

13. The non-vinyl plastic identification card printing system of claim 12, wherein the non-linear pixel density adjustment curve comprises a parametric curve.

14. The non-vinyl plastic identification card printing system of claim 13, wherein the parametric curve comprises a quadratic curve.

15. The non-vinyl plastic identification card printing system of claim 12, wherein the card transport mechanism is reversible.

16. The non-vinyl plastic identification card printing system claim 12, wherein the card transport mechanism is configured to transport the non-vinyl plastic identification card having dimensions of about 85.60 mm by about 53.98 mm with rounded corners with a radius of about 3.18 mm.

17. The non-vinyl plastic identification card printing system of claim 12, wherein the multi-color image comprises a background graphical image.

18. The non-vinyl plastic identification card printing system of claim 12, further comprising at least one of the following:

an encoder that is configured to encode data on a magnetic stripe on the non-vinyl plastic identification card;

a chip programmer that is configured to program data on the integrated circuit chip on the non-vinyl plastic identification card;

an additional printer that is configured to print data on the non-vinyl plastic identification card;

a laser that is configured to mark data on the non-vinyl plastic identification card.

19. The non-vinyl plastic identification card printing system of claim 12, wherein the non-vinyl plastic identification card comprises a financial card.

20. The non-vinyl plastic identification card printing system of claim 12, further comprising a chip programmer that is configured to program data on the integrated circuit chip on the non-vinyl plastic identification card.

* * * * *